US012571965B2

(12) United States Patent　(10) Patent No.:　US 12,571,965 B2

Mouri et al.　(45) Date of Patent:　Mar. 10, 2026

(54) FUSION SPLICING MACHINE

(71) Applicant: SUMITOMO ELECTRIC INDUSTRIES, LTD., Osaka (JP)

(72) Inventors: Shintaro Mouri, Osaka (JP); Soichi Endo, Osaka (JP); Akinori Kimura, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 168 days.

(21) Appl. No.: 18/558,378

(22) PCT Filed: May 19, 2022

(86) PCT No.: PCT/JP2022/020839
§ 371 (c)(1),
(2) Date: Nov. 1, 2023

(87) PCT Pub. No.: WO2022/244843
PCT Pub. Date: Nov. 24, 2022

(65) Prior Publication Data
US 2024/0230999 A1　Jul. 11, 2024

(30) Foreign Application Priority Data

May 21, 2021　(JP) ................................. 2021-086222

(51) Int. Cl.
*G02B 6/255*　(2006.01)
(52) U.S. Cl.
CPC .................................. *G02B 6/2553* (2013.01)

(58) Field of Classification Search
None
See application file for complete search history.

(56) References Cited

U.S. PATENT DOCUMENTS 5,013,345 A * 5/1991 Itoh ...................... G02B 6/2555
65/407
2003/0123836 A1 7/2003 Fujisawa et al.
(Continued)

FOREIGN PATENT DOCUMENTS

CN　103424808 A　12/2013
EP　3159720 B1　8/2018
(Continued)

OTHER PUBLICATIONS

International Search Report issued in Patent Application No. PCT/JP2022/020839 dated Jul. 12, 2022.

*Primary Examiner* — Lisa L Herring
(74) *Attorney, Agent, or Firm* — McDonald Hopkins LLC

(57) ABSTRACT

A fusion splicing machine according to one embodiment includes: an optical fiber holder holding the optical fiber in the state of allowing a tip end of the optical fiber to protrude; a rotation mechanism arranged on the opposite side of the tip end of the optical fiber holder and rotating the optical fiber holder around the axis extending along the optical fiber; a bending portion bending the optical fiber; a light source irradiating the optical fiber bent by the bending portion with light from the side of the optical fiber; and a power supply unit supplying power to the light source. The bending portion and the light source are arranged on any of the tip end side of the optical fiber from the optical fiber holder, the optical fiber holder, and the rotation mechanism.

5 Claims, 14 Drawing Sheets

(56)             References Cited

U.S. PATENT DOCUMENTS

2004/0190839 A1      9/2004  Bush et al.
2025/0093582 A1 *   3/2025  Mouri .................. G02B 6/2553

FOREIGN PATENT DOCUMENTS

JP        S61-077019  A        4/1986
JP        S61-194411  A        8/1986
JP        2001-330749  A      11/2001
JP        2004-053625  A        2/2004
JP        2004-126379  A        4/2004
JP        2021-105646  A        7/2021
WO     WO-2011130736  A1 *  10/2011    .......... G02B 6/2555
WO        2013/077002  A1        5/2013

* cited by examiner

FUSION SPLICING MACHINE

TECHNICAL FIELD

The present disclosure relates to fusion splicing machines.

This application claims priority based on Japanese Patent Application No. 2021-086222 dated May 21, 2021, and incorporates all the descriptions described in the Japanese Patent Application.

BACKGROUND ART

Patent Literature 1 describes a fusion splicing device. The fusion splicing device includes a pair of V-groove bases on which a pair of optical fibers are placed, an LED lamp arranged on each side of the pair of optical fibers, and a first television camera and a second television camera for capturing the pair of optical fibers. The LED lamp allows light to be incident on the optical fiber from the side of the optical fiber. The light incident on the optical fiber from the side is emitted from the end face of the optical fiber. The first television camera and the second television camera capture the image of the end face of the optical fiber that emits the light.

Patent Literature 2 describes a connection device of the optical fiber. The connection device connects a pair of photonic crystal fibers (PCFs) together. The connection device includes two holding members that hold the two PCFs, respectively, and a first driving unit that supports and moves each holding member. Further, the connection device includes a mirror and a mirror driving member positioned between the two PCFs and the cameras for capturing the image reflected on the mirror. In the connection device, the light is irradiated from the side of the camera by vertical illumination. The core of the end face can be observed in the state where the entire end face of the PCF is illuminated by this light irradiation.

CITATION LIST

Patent Literature

Patent Literature 1: International Publication WO 2013/077002

Patent Literature 2: Japanese Unexamined Patent Publication No. 2004-53625

SUMMARY OF INVENTION

A fusion splicing machine according to the present disclosure includes: an optical fiber holder holding an optical fiber in the state of allowing a tip end of the optical fiber to protrude; a rotation mechanism arranged on the opposite side of the tip end of the optical fiber holder and rotating the optical fiber holder around the axis extending along the optical fiber; a bending portion bending the optical fiber; a light source irradiating the optical fiber bent by the bending portion with light from the side of the optical fiber; and a power supply unit supplying power to the light source. The bending portion and the light source are arranged on any of the tip end side of the optical fiber from the optical fiber holder, the optical fiber holder, and the rotation mechanism.

Advantageous Effects of Invention

According to the present disclosure, it is possible to suppress power of a light source and sufficiently illuminate an end face of the optical fiber.

DESCRIPTION OF EMBODIMENTS

Figure 1:
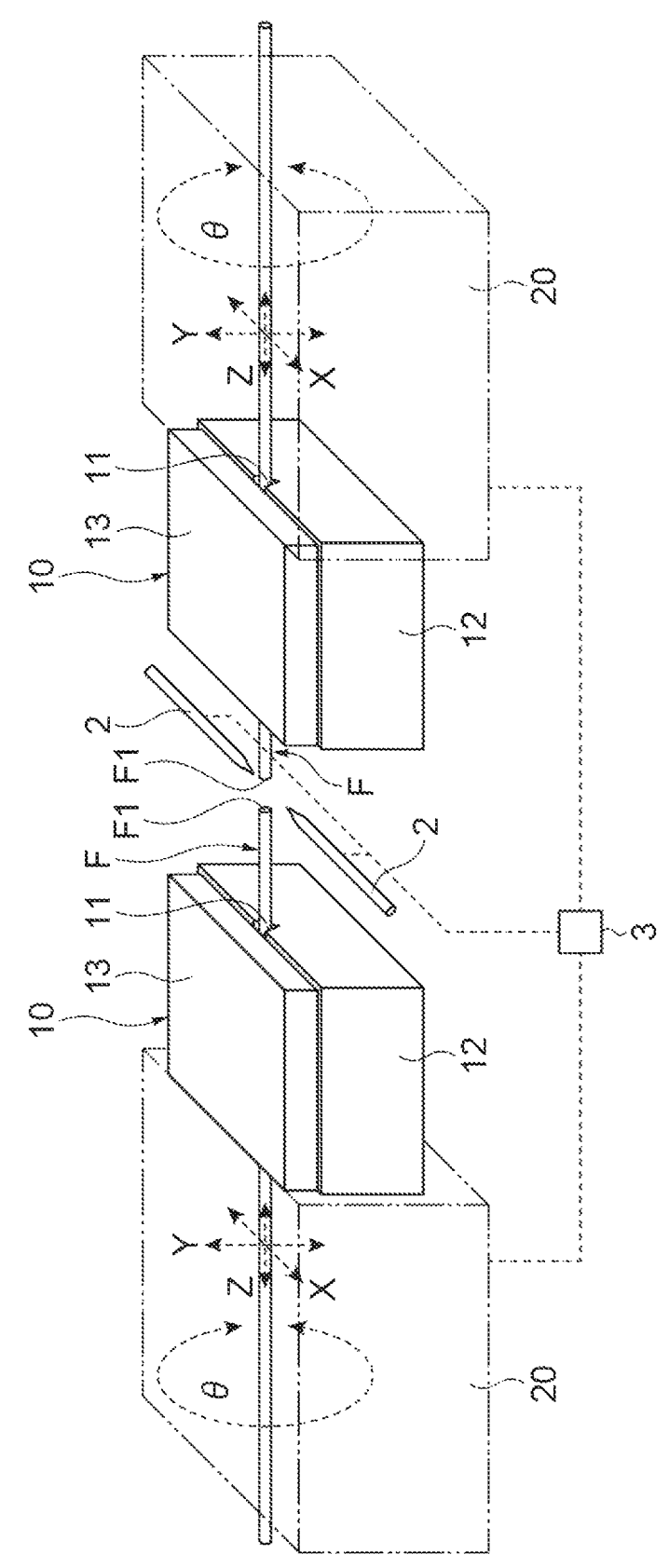
FIG. 1 is a diagram schematically illustrating a fusion splicing machine according to an embodiment.

In some cases, in the method for illuminating the end face of the optical fiber by irradiating the optical fiber with a light source such as the above-mentioned vertical illumination, specifying core locations with high accuracy may be difficult. When the end face of the optical fiber is illuminated as described above, the end face of the optical fiber cannot be sufficiently illuminated unless the power of the light source is increased.

An object of the present disclosure is to provide a fusion splicing machine capable of suppressing power of a light source and sufficiently illuminating an end face of an optical fiber.

Description of Embodiments of Present Disclosure

First, contents of embodiments of the present disclosure will be listed and described. A fusion splicing machine according to an embodiment of the present disclosure includes an optical fiber holder holding the optical fiber in a state where a tip end of the optical fiber is protruded, a rotation mechanism arranged on an opposite side of the tip end of the optical fiber holder and for rotating the optical fiber holder around an axis extending along the optical fiber, a bending portion bending the optical fiber, a light source allowing light to be incident on the optical fiber bent by the bending portion from the side of the optical fiber, and a power supply unit for supplying power to the light source. The bending portion and the light source are arranged on any of the tip end side of the optical fiber from the optical fiber holder, the optical fiber holder, and the rotation mechanism.

In this fusion splicing machine, the optical fiber holder holds the optical fiber with the tip end of the optical fiber protruding. The rotation mechanism for rotating the optical fiber holder is arranged on the opposite side of the tip end of the optical fiber holder. The fusion splicing machine includes the bending portion bending the optical fiber and the light source allows light to be incident on the optical fiber bent by the bending portion from the side of the optical fiber. By allowing the light to be incident on the portion bending the optical fiber from the side of the optical fiber, the end face of the tip end of the optical fiber can be illuminated. The bending portion bending the optical fiber and the light source are arranged on any of the tip end side of the optical fiber from the optical fiber holder, the optical fiber holder, and the rotation mechanism. By arranging the bending portion and the light source near the tip end of the optical fiber, the end face of the optical fiber can be sufficiently illuminated even if the power of the light source is not strong. As a result, the position of the core can be specified with high accuracy.

The fusion splicing machine described above may include a holder base on which the optical fiber holder is mounted. The optical fiber holder may be removable with respect to the holder base. The bending portion and the light source may be arranged on any of the holder base and the optical fiber holder. In this case, the fusion splicing machine has the holder base, and the optical fiber holder is removable from the holder base. Since the optical fiber holder is detachable from the holder base, the optical fiber can be easily attached to and detached from the rotation mechanism. The bending portion and the light source are arranged on any of the holder base and the optical fiber holder. Therefore, the optical fiber holder and the holder base can be effectively used as the place where the bending portion and the light source are arranged. Since any of the optical fiber holder and the holder base holds the bending portion and the light source, there is no need to arrange another component holding the bending portion and the light source, which contributes to miniaturization of the fusion splicing machine.

The above-described fusion splicing machine includes a first electrode arranged on the optical fiber holder and a second electrode arranged on the holder base. The light source may receive power from the power supply unit by electrically connecting the first electrode and the second electrode to each other when the optical fiber holder is mounted on the holder base. The "power supply unit" refers to supplying power to the light source, for example, indicating the portion of the fusion splicing machine electrically connected to the light source. The "power supply unit" may be, for example, a wiring portion of the fusion splicing machine connected to the power source (as an example, the household power source, the outlet) when the fusion splicing machine is driven by an AC power source (when the fusion splicing machine does not have a battery). The "power supply unit" may be a wiring portion inside the fusion splicing machine connected to the battery when the fusion splicing machine has the battery. The fusion splicing machine may have its own battery connected to the power supply unit that powers the light source. In the case of the above-described fusion splicing machine, the first electrode is arranged on the optical fiber holder, and the second electrode is arranged on the holder base. Therefore, the optical fiber holder and the holder base can be effectively used as places for arranging the first electrode and the second electrode.

The fusion splicing machine described above may include the power source positioned in any of the optical fiber holder and the holder base. The light source may receive power from the power source through the power supply unit. In this case, the optical fiber holder and the holder base can be effectively used as the place for arranging the power source.

The fusion splicing machine described above may include the clamp unit pressing the tip end portion of the optical fiber held by the optical fiber holder. The bending portion and the light source may be arranged in the clamp unit. In this case, the bending portion and the light source are arranged in the clamp unit pressing the tip end portion of the optical fiber. Therefore, the clamp unit can be effectively used as the place for arranging the bending portion and the light source.

Details of Embodiment of Present Disclosure

Hereinafter, specific examples of the fusion splicing machine according to the present disclosure will be described below with reference to the drawings. In the description of the drawings, the same or corresponding elements are denoted by the same reference numerals, and overlapping descriptions are omitted as appropriate. The drawings may be simplified or exaggerated for easy understanding, and dimensional ratios and the like are not limited to those described in the drawings.

First, the configuration of the fusion splicing machine according to this embodiment will be described with reference to FIG. 1. FIG. 1 is a diagram describing the outline of the fusion splicing machine according to this embodiment. As illustrated in FIG. 1, a fusion splicing machine 1 fusion-splices a pair of optical fibers F to each other. The fusion splicing machine 1 has an optical fiber holder 10 having a V-groove 11 and a rotation mechanism 20 rotating the optical fiber holder 10.

The fusion splicing machine 1 includes the pair of optical fiber holders 10 arranged along the Z-axis direction in which the optical fibers F extend, and a pair of rotation mechanisms 20 arranged along the Z-axis direction. The optical fiber F which is a fusion-splicing target is positioned in the V-groove 11 of each optical fiber holder 10. The optical fiber holder 10 is made of, as an example, resin. The optical fiber holder 10 holds, for example, the coated portion of the optical fiber F. The optical fiber holder 10 holds a tip end F1 of the optical fiber F in the state of protruding in the Z-axis direction.

The pair of discharge electrodes 2 are arranged at positions where the tip ends F1 of the pair of optical fibers F face each other. The pair of discharge electrodes 2 are arranged at positions facing each other along the direction intersecting the optical fiber F (for example, the X-axis direction). The optical fiber holder 10 has, for example, a base 12 in which the V-groove 11 extending along the Z-axis direction is formed and the optical fiber F is mounted, and a lid 13 mounted on the base 12. The base 12 and the lid 13 are arranged, for example, along the Y-axis direction that intersects both the X-axis direction and the Z-axis direction.

The pair of discharge electrodes 2 fusion-splice the tip ends F1 of the pair of optical fibers F by discharge. For example, the fusion splicing machine 1 has a control unit 3 controlling each unit of the fusion splicing machine 1. By controlling the discharge current and the discharge time of the discharge electrode 2 by the control unit 3, the fusion-splicing is performed under the fusion-splicing conditions suitable for the type of the optical fiber F. In the fusion splicing machine 1, position-alignment of the pair of optical fibers F is performed by the control unit 3.

The control unit 3 adjusts the position of each optical fiber F in the X-axis direction and the Y-axis direction, and aligns the axes of the pair of optical fibers F so that the pair of optical fibers F are arranged in a straight line along the Z-axis direction. That is, the control unit 3 performs alignment of the pair of optical fibers F in the X-axis direction, the Y-axis direction, and the Z-axis direction. The control unit 3 controls the rotation mechanism 20 to rotate the optical fiber F around the Z axis, so that alignment is performed in the θ direction.

The optical fiber F is, for example, an optical fiber that requires rotational alignment in the fusion splicing machine 1. That is, the optical fiber F is an optical fiber that needs to match the positions of the pair of optical fibers F in the θ direction. For example, the optical fiber F is a multi core fiber (MCF) or a polarization maintaining fiber (PMF).

Figure 2:
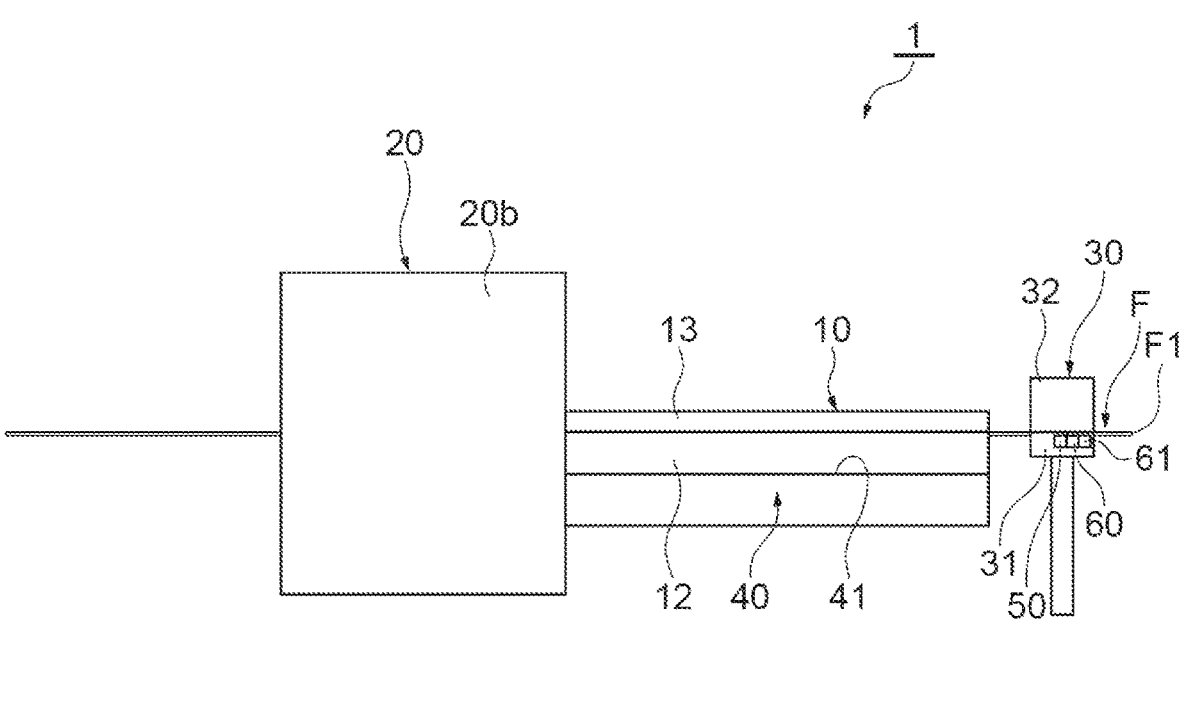
FIG. 2 is a side view schematically illustrating an optical fiber holder, a rotation mechanism, and a clamp unit of the fusion splicing machine according to the embodiment.

FIG. 2 is a side view illustrating the optical fiber holder 10 and the rotation mechanism 20 of the fusion splicing machine 1. As illustrated in FIG. 2, the fusion splicing machine 1 according to the present embodiment includes a clamp unit 30 pressing the tip end F1 side portion of the optical fiber F held by the optical fiber holder 10. Furthermore, the fusion splicing machine 1 includes a holder base 40 fixed to the rotation mechanism 20, a bending portion 50 bending the optical fiber F, and a light source 60.

The portion of the optical fiber F pressed by the clamp unit 30 is, for example, the coated portion of the optical fiber F. In this case, only the portion of the optical fiber F protruding from the clamp unit 30 is the portion from which the coating is removed. However, the portion pressed by the clamp unit 30 may be the portion from which the coating of the optical fiber F is removed (for example, the portion where the glass of the optical fiber F is exposed). The length of the portion of the optical fiber F protruding from the clamp unit 30 is, for example, 5 mm or less. In this case, the force with which the clamp unit 30 presses the optical fiber F is the force with this degree that does not hinder the rotation of the optical fiber F.

The holder base 40 is made of, for example, metal. The holder base 40 has a mounting surface 41 on which the optical fiber holder 10 is mounted. For example, the optical fiber holder 10 is detachable from the holder base 40. In this case, the optical fiber F can be held in the optical fiber holder 10 removed from the holder base 40, and the optical fiber holder 10 holding the optical fiber F can be mounted on the holder base 40. Furthermore, the optical fiber holder can be replaced with the optical fiber holder 10 having the appropriate V-groove 11 according to the diameter of the optical fiber F (coating diameter or glass diameter).

The holder base 40 extends from the rotation mechanism 20 in the Z-axis direction. The rotation mechanism 20 is arranged on the opposite side of the optical fiber holder 10 from the tip end F1. The rotation mechanism 20 has, for example, the recessed portion (not illustrated) into which the optical fiber F is inserted. The recessed portion has a slit shape recessed from an outer peripheral surface 20b of the rotation mechanism 20 along the Y-axis direction. The rotation mechanism 20 rotates, for example, the optical fiber F together with the holder base 40 and the optical fiber holder 10 around the axis extending along the center of the optical fiber F.

The rotation mechanism 20 includes, for example, a motor (not illustrated) and gears (not illustrated). In this case, the motor of the rotation mechanism 20 is driven and the rotational driving force of the motor is transmitted to the holder base 40 and the optical fiber holder 10 through the gears, so that the holder base 40 and the optical fiber holder are rotated. The optical fiber F is inserted into the recessed portion of the rotation mechanism 20 and held by the optical fiber holder 10. Therefore, as the optical fiber holder 10 is rotated by the rotation mechanism 20, the optical fiber F is also rotated.

The clamp unit 30 is provided, for example, to stabilize the optical fiber F protruding from the optical fiber holder 10. The clamp unit 30 includes, for example, a base 31 on which the optical fiber F is placed, and a lid 32 covering the optical fiber F placed on the base 31. The clamp unit 30 holds the optical fiber F by interposing the optical fiber F extending in the Z-axis direction from the optical fiber holder 10 between the base 31 and the lid 32.

The fusion splicing machine 1 includes the bending portion 50 bending the optical fiber F and the light source 60 irradiating the optical fiber F bent by the bending portion 50 with the light from the side of the optical fiber F (for example, in the direction intersecting the Z-axis direction). In this embodiment, the bending portion 50 and the light source 60 are arranged in the clamp unit 30. The bending portion 50 presses, for example, the optical fiber F to bend the surface of the optical fiber F. The bending portion 50 may be the portion where the optical fiber F itself is bent.

The light source 60 is a light source for observing the end face of the tip end F1 of the optical fiber F. The light source 60 allows the light to be incident on the optical fiber F bent by the bending portion 50 from the side (for example, in the direction intersecting the Z-axis direction). The light from the light source 60 is allowed to be incident on the bending portion of the optical fiber F from the side, so that the core on the end face of the optical fiber F can be observed. As an example, the light source 60 is an LED light source.

Figure 3:
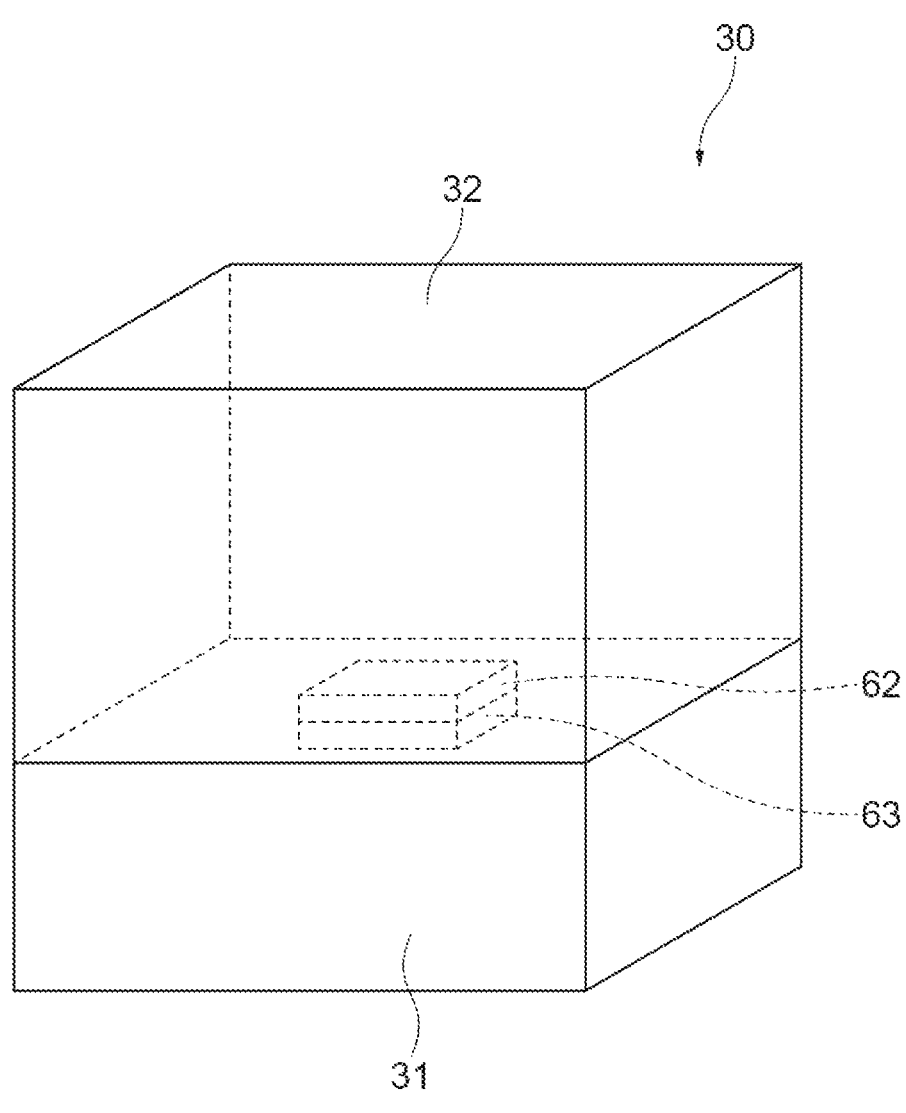
FIG. 3 is a perspective view schematically illustrating a first electrode and a second electrode of the fusion splicing machine according to the embodiment.

In this embodiment, the bending portion 50 and the light source 60 are arranged on the base 31 of the clamp unit 30. For example, the fusion splicing machine 1 includes a power source 61, and the light source 60 receives power from the power source 61 through the power supply unit and emits light. The power source 61 is, for example, the battery arranged on the base 31. As illustrated in FIG. 3, the fusion splicing machine 1 may include a first electrode 62 arranged on the lid 32 and a second electrode 63 arranged on the base 31. In this case, the light source 60 is electrically connected to the first electrode 62 and the second electrode 63 when the lid 32 is placed on the base 31, so that the light source 60 receives power from the power source at a position other than the base 31 through the power supply unit, the first electrode 62, and the second electrode 63.

Next, the functions and effects obtained from the fusion splicing machine 1 according to this embodiment will be described. In the fusion splicing machine 1, the optical fiber holder 10 holds the optical fiber F in the state of allowing the tip end F1 of the optical fiber F to protrude. The rotation mechanism 20 rotating the optical fiber holder 10 is arranged on the opposite side of the tip end F1 of the optical fiber holder 10. The fusion splicing machine 1 includes the bending portion 50 bending the optical fiber F, and the light source 60 that allows light to be incident on the optical fiber F bent by the bending portion 50 from the side of the optical fiber F. By allowing light to be incident on the bending portion of the optical fiber F from the side of the optical fiber F, the end face (tip end F1) of the optical fiber F can be illuminated. The bending portion 50 bending the optical fiber F and the light source 60 are arranged closer to the tip end F1 side of the optical fiber F than the optical fiber holder 10. By arranging the bending portion 50 and the light source 60 near the tip end F1 of the optical fiber F, the end face of the optical fiber F can be sufficiently illuminated even if the power of the light source 60 is not strong. As a result, the position of the core can be specified with high accuracy.

The fusion splicing machine 1 may include the holder base 40 on which the optical fiber holder 10 is mounted. The optical fiber holder may be detachable from the holder base 40. In this case, the fusion splicing machine 1 has the holder base 40, so that the optical fiber holder can be removed from the holder base 40. Since the optical fiber holder 10 is detachable from the holder base 40, the optical fiber F can be easily attached to and detached from the rotation mechanism 20.

As described above, the fusion splicing machine 1 may include the clamp unit 30 pressing the tip end F1 side portion of the optical fiber F held by the optical fiber holder 10. The bending portion 50 and the light source 60 may be arranged in the clamp unit 30. In this case, the bending portion 50 and the light source 60 are arranged in the clamp unit pressing the portion of the optical fiber F on the tip end F1 side. Therefore, the clamp unit 30 can be effectively used as the place for arranging the bending portion 50 and the light source 60.

Next, various modifications of the fusion splicing machine according to the present disclosure will be described. A portion of the configuration of the fusion splicing machine of each Modified Example described later overlaps with the portion of the configuration of the fusion splicing machine 1 described above. In the following description, explanations that overlap with the configuration of the fusion splicing machine 1 described above will be omitted as appropriate by denoting the same reference numerals.

Figure 4:
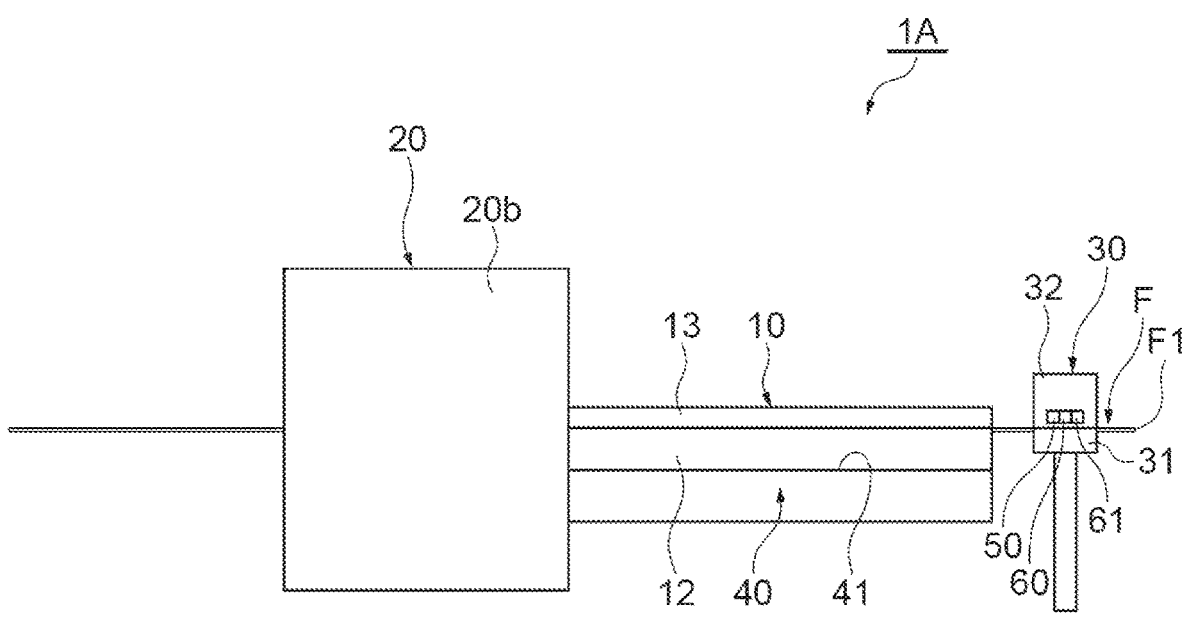
FIG. 4 is a side view schematically illustrating an optical fiber holder, a rotation mechanism, and a clamp unit of a fusion splicing machine according to Modified Example 1.
Figure 4:
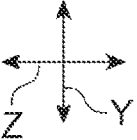

FIG. 4 is a side view illustrating a fusion splicing machine 1A according to Modified Example 1. As illustrated in FIG. 4, the fusion splicing machine 1A differs from the described-above fusion splicing machine 1 in terms of the arrangement positions of the bending portion 50 and the light source 60. In Modified Example 1, the bending portion 50 and the light source 60 are arranged on the lid 32 of the clamp unit 30. The fusion splicing machine 1A includes the power source 61 supplying power to the light source 60 through the power supply unit, and the power source 61 is arranged on the lid 32.

As described above, the first electrode 62 and the second electrode 63 may be arranged, and power may be supplied to the light source 60 from the power source positioned at other than the position through the power supply unit, the first electrode 62, and the second electrode 63. Also in the case of the fusion splicing machine 1A according to the modified example, by arranging the bending portion 50 and the light source 60 near the tip end F1 of the optical fiber F, the end face of the optical fiber F can be sufficiently illuminated even if the power of the light source 60 is not strong. Therefore, the same effects as in the fusion splicing machine 1 can be obtained.

Figure 5:
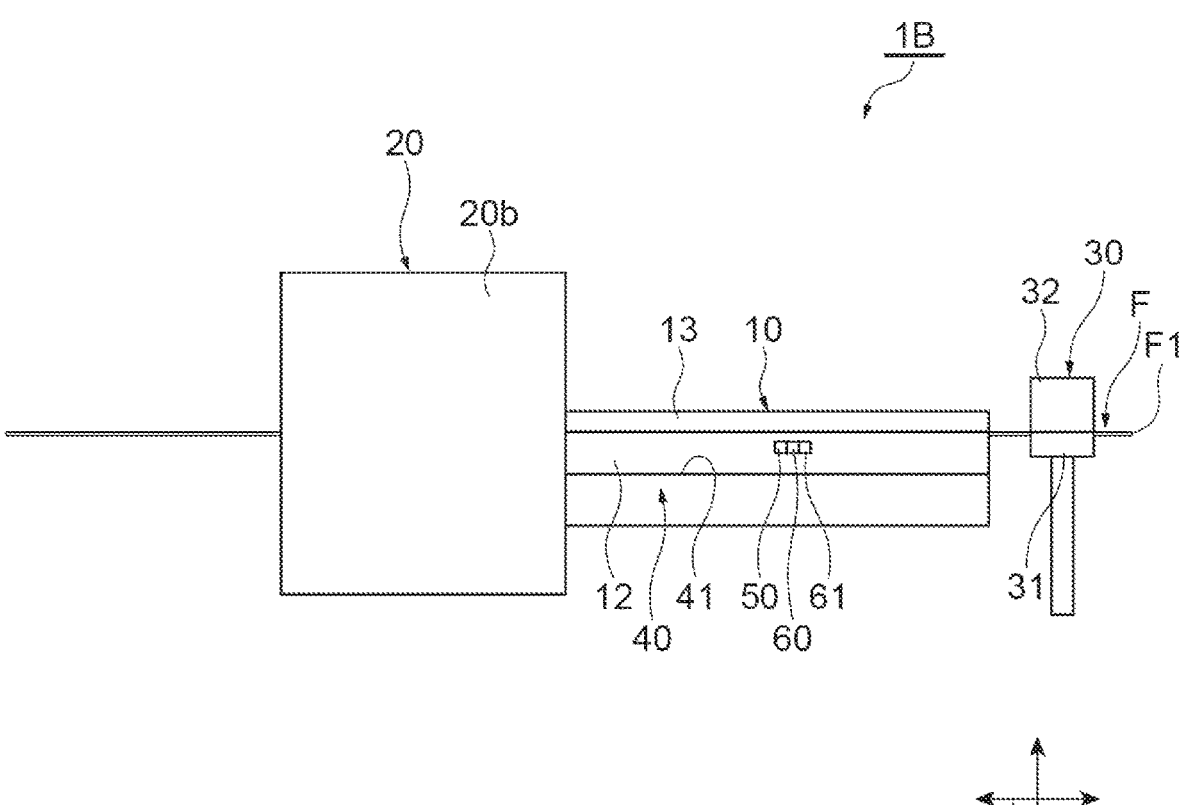
FIG. 5 is a side view schematically illustrating an optical fiber holder, a rotation mechanism, and a clamp unit of a fusion splicing machine according to Modified Example 2.

FIG. 5 is a side view illustrating a fusion splicing machine 1B according to Modified Example 2. As illustrated in FIG. 5, in the fusion splicing machine 1B, the bending portion 50, the light source 60, and the power source 61 are arranged on the base 12 of the optical fiber holder 10. The fusion splicing machine 1B may include the first electrode 62 arranged on the optical fiber holder 10 and the second electrode 63 arranged on the holder base 40. In this case, when the optical fiber holder 10 is mounted on the holder base 40, the first electrode 62 and the second electrode 63 are in contact with each other, so that the light source 60 can receive power from the power source positioned at other than the position through the power supply unit, the first electrode 62, and the second electrode 63, and emits light. As another example, the first electrode 62 may be arranged on the lid 13 of the optical fiber holder 10, and the second electrode 63 may be arranged on the base 12 of the optical fiber holder 10. The bending portion 50 and the light source 60 may be arranged on the holder base 40.

As described above, also in the fusion splicing machine 1B according to Modified Example 2, the bending portion 50 and the light source 60 are arranged at positions close to the tip end F1 of the optical fiber F. Therefore, effects similar to those of the above-described examples can be obtained. In the fusion splicing machine 1B, the bending portion 50 and the light source 60 are arranged on any of the holder base 40 and the optical fiber holder 10. Therefore, the optical fiber holder 10 and the holder base 40 can be effectively used as the place where the bending portion 50 and the light source 60 are arranged. Since any of the optical fiber holder 10 and the holder base 40 holds the bending portion 50 and the light source 60, there is no need to arrange another component holding the bending portion 50 and the light source 60. Therefore, this configuration contributes to miniaturization of the fusion splicing machine 1B.

The fusion splicing machine 1B may include the first electrode 62 arranged on the optical fiber holder 10 and the second electrode 63 arranged on the holder base 40. The light source 60 may receive power generated by allowing the first electrode 62 and the second electrode 63 to be in contact with each other when the optical fiber holder 10 is mounted on the holder base 40. In this case, the first electrode 62 is arranged on the optical fiber holder 10, and the second electrode 63 is arranged on the holder base 40. Therefore, the optical fiber holder 10 and the holder base 40 can be effectively used as places for arranging the first electrode 62 and the second electrode 63 that supply power to the light source 60.

The fusion splicing machine 1B may include the power source 61 arranged on either the optical fiber holder 10 or the holder base 40. The light source 60 may receive power from the power source 61. In this case, the optical fiber holder 10 and the holder base 40 can be effectively used as the place for arranging the power source 61.

Figure 6:
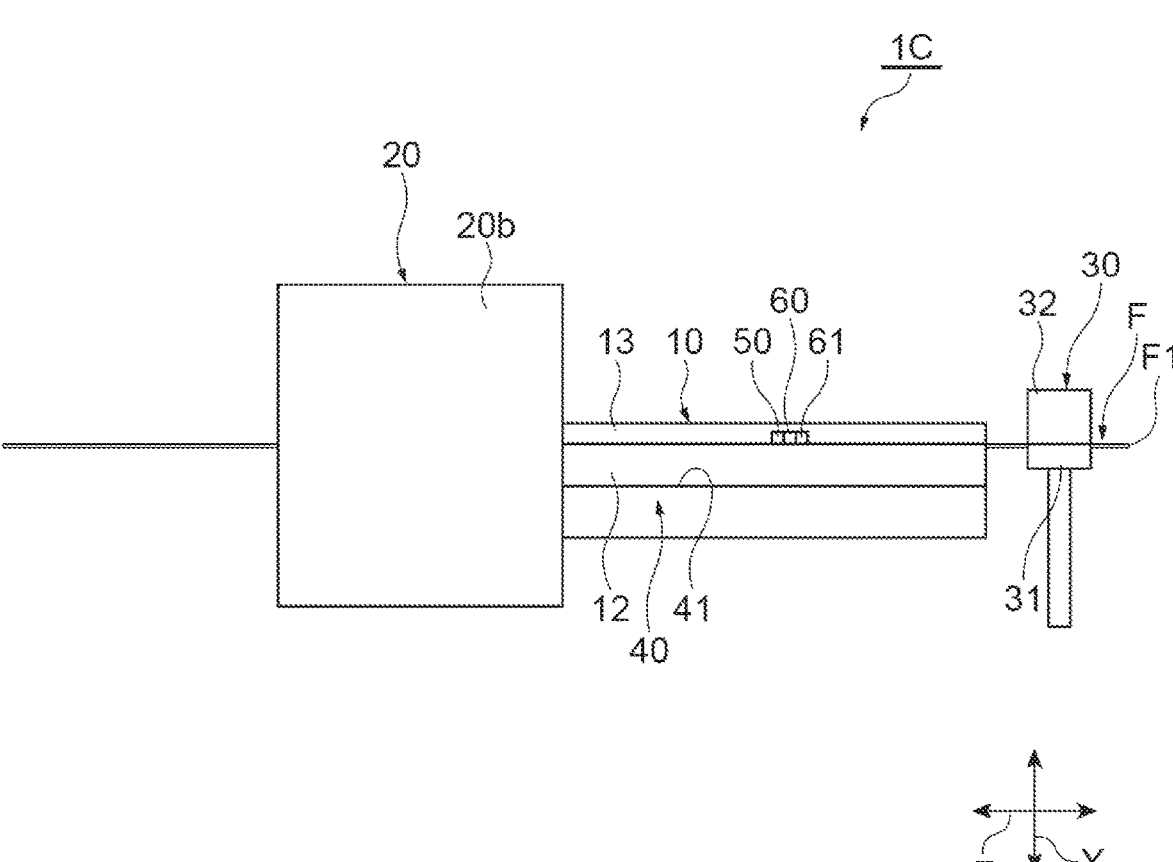
FIG. 6 is a side view schematically illustrating an optical fiber holder, a rotation mechanism, and a clamp unit of a fusion splicing machine according to Modified Example 3.

FIG. 6 is a side view illustrating a fusion splicing machine 1C according to Modified Example 3. As illustrated in FIG. 6, in the fusion splicing machine 1C, the bending portion 50, the light source 60, and the power source 61 are arranged on the lid 13 of the optical fiber holder 10. In the fusion splicing machine 1C as well, since the bending portion 50 and the light source 60 are arranged near the tip end F1 of the optical fiber F, the same effects as in the fusion splicing machine 1B can be obtained. Also in Modified Example 3 and modified examples described later, power can be supplied from the power source positioned at other than the position through the power supply unit, the first electrode 62, and the second electrode 63. In the following description, description and illustration of the first electrode 62 and the second electrode 63 are omitted as appropriate.

Figure 7:
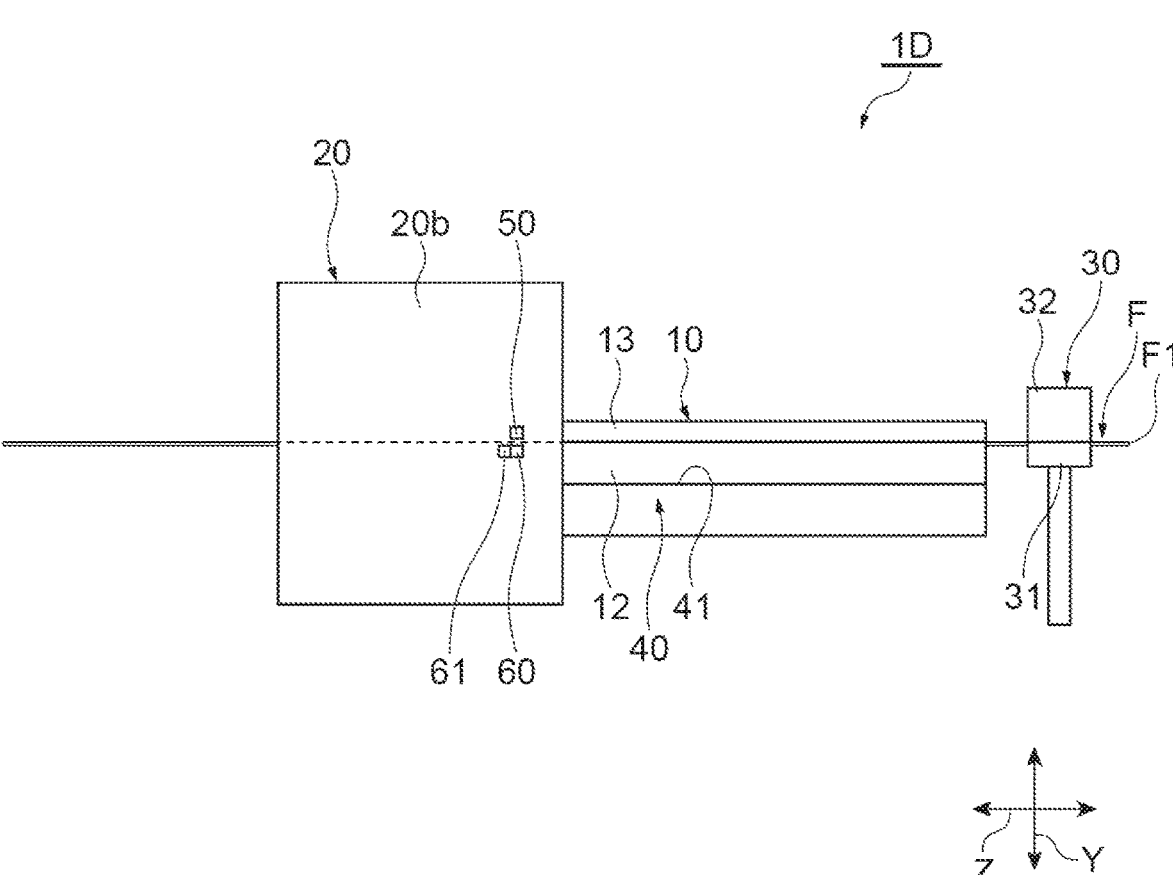
FIG. 7 is a side view schematically illustrating an optical fiber holder, a rotation mechanism, and a clamp unit of a fusion splicing machine according to Modified Example 4.
Figure 8:
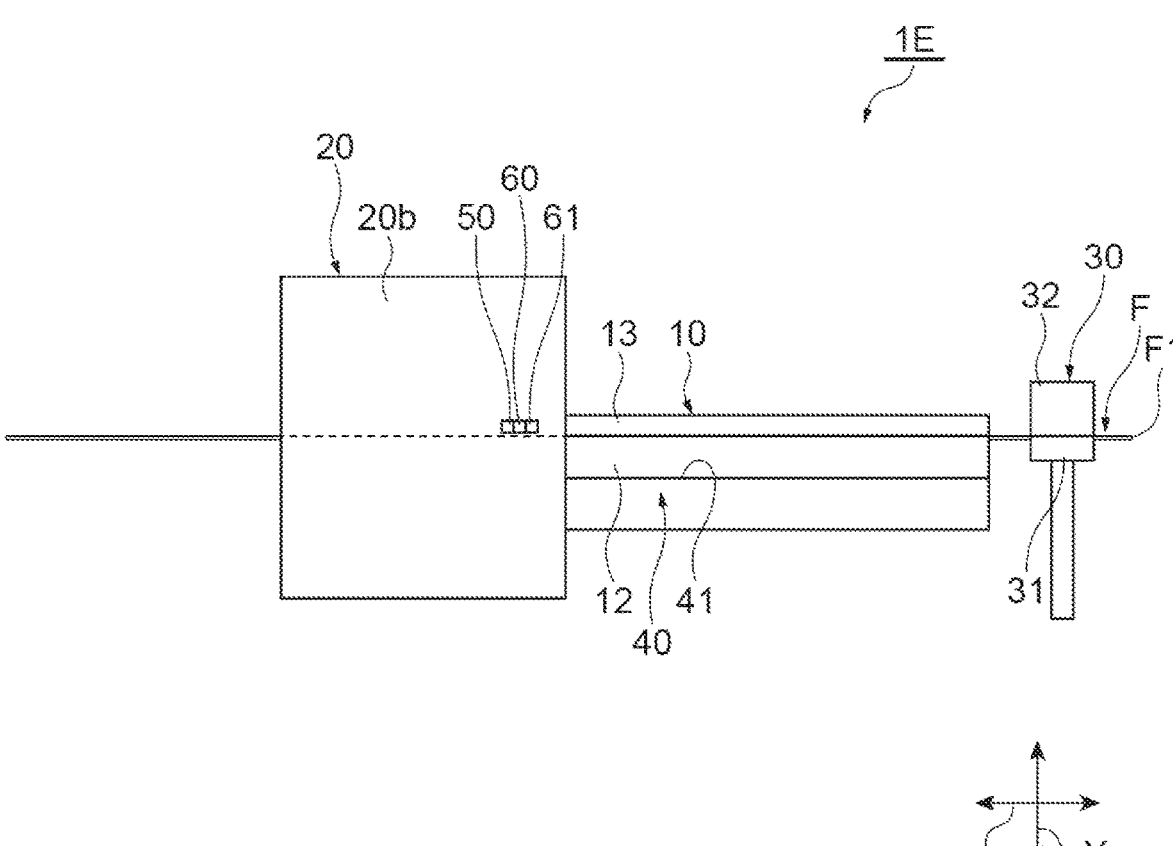
FIG. 8 is a side view schematically illustrating an optical fiber holder, a rotation mechanism, and a clamp unit of a fusion splicing machine according to Modified Example 5.

FIG. 7 is a side view illustrating a fusion splicing machine 1D according to Modified Example 4. FIG. 8 is a side view illustrating a fusion splicing machine 1E according to Modified Example 5. As illustrated in FIGS. 7 and 8, in the fusion splicing machines 1D and 1E, the bending portion 50, the light source 60 and the power source 61 are arranged in the rotation mechanism 20. The bending portion 50 is, for example, a clamping mechanism embedded into the rotation mechanism 20. In the fusion splicing machine 1D, the bending portion 50 and the light source 60 are arranged at positions interposing the optical fiber F. On the other hand, in the fusion splicing machine 1E, the bending portion 50 and the light source 60 are arranged on the same side (upper side in FIG. 7) when viewed from the optical fiber F. In the fusion splicing machine 1D according to Modified Example 4 and the fusion splicing machine 1E according to Modified Example 5, since the bending portion 50 and the light source 60 are arranged at the position close to the tip end F1 of the optical fiber F, the same effects as that of each example described above can be obtained.

Figure 9:
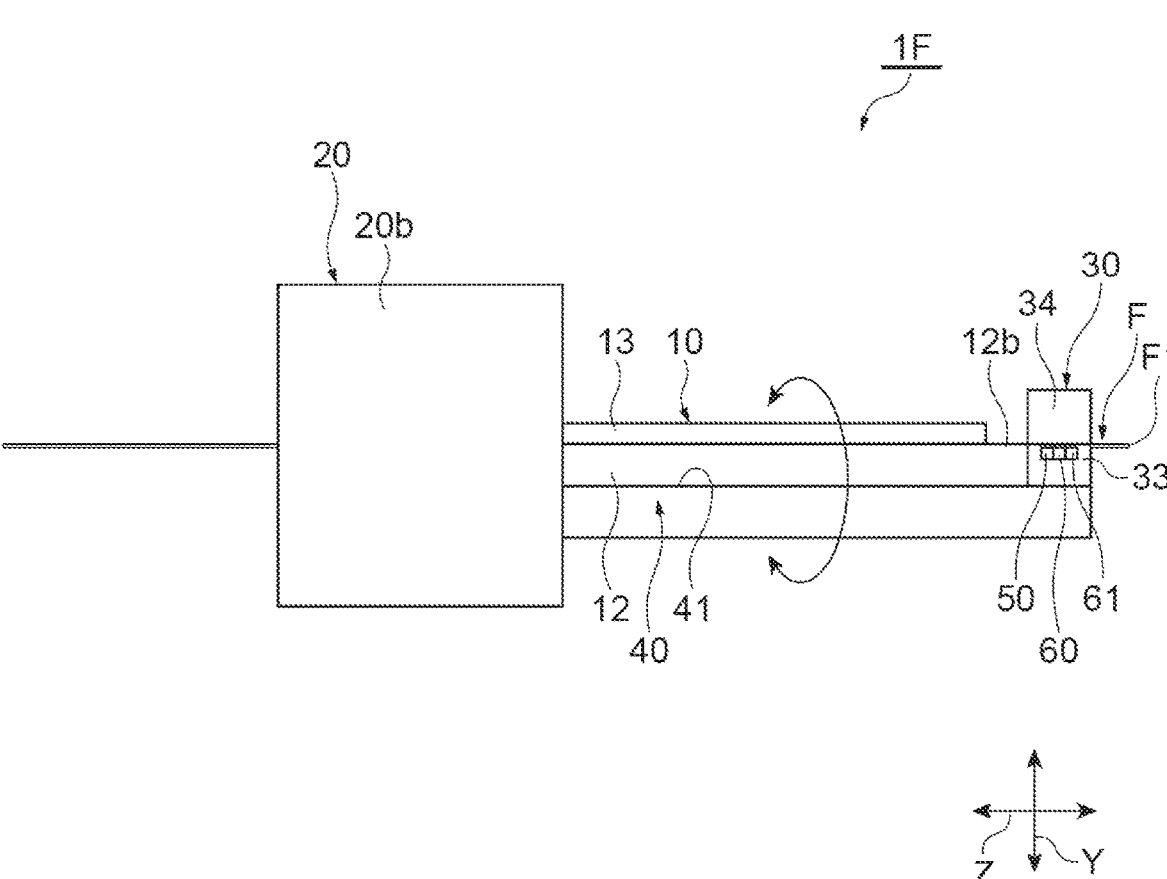
FIG. 9 is a side view schematically illustrating an optical fiber holder, a rotation mechanism, and a clamp unit of a fusion splicing machine according to Modified Example 6.

FIG. 9 is a side view illustrating a fusion splicing machine 1F according to Modified Example 6. The fusion splicing machine 1F differs from the above-described fusion splicing machine 1 in terms of the configurations of the optical fiber holder 10 and the clamp unit 30. The length of the base 12 of the optical fiber holder 10 in the Z-axis direction is longer than the length of the lid 13 of the optical fiber holder in the Z-axis direction. For example, the base 12 extends to the opposite side of the rotation mechanism 20 beyond the lid 13. In this case, the base 12 has an exposed portion 12b where a portion of the V-groove 11 is exposed on the side opposite to the rotation mechanism 20. The optical fiber F placed on the V-groove 11 exposed to the exposed portion 12b is pressed by the clamp unit 30.

The rotation mechanism 20 rotates, for example, the optical fiber F together with the holder base 40, the optical fiber holder 10, and the clamp unit 30 around the axis extending along the center of the optical fiber F. The clamp unit 30 includes, for example, a fixing portion 33 fixed to the holder base 40 and a lid 34 placed on the fixing portion 33. The fixing portion 33 is arranged so that the V-groove on which the optical fiber F is placed is positioned on the extension of the V-groove 11 of the base 12. The optical fiber F extending from the V-groove 11 along the Z-axis direction is placed on the V-groove of the fixing portion 33.

In the fusion splicing machine 1F, the bending portion 50, the light source 60, and the power source 61 are arranged on the fixing portion 33 of the clamp unit 30. In the fusion splicing machine 1F as well, since the bending portion 50 and the light source 60 are arranged at positions close to the tip end F1 of the optical fiber F, the same effects as those of the above-described examples can be obtained. Furthermore, in the fusion splicing machine 1F, the rotation mechanism 20 rotates the clamp unit 30 pressing the optical fiber F together with the optical fiber holder 10. Since the clamp unit 30 pressing the optical fiber F rotates together with the optical fiber holder 10 during rotation of the optical fiber F, the optical fiber F can be prevented from being damaged during rotation.

Figure 10:
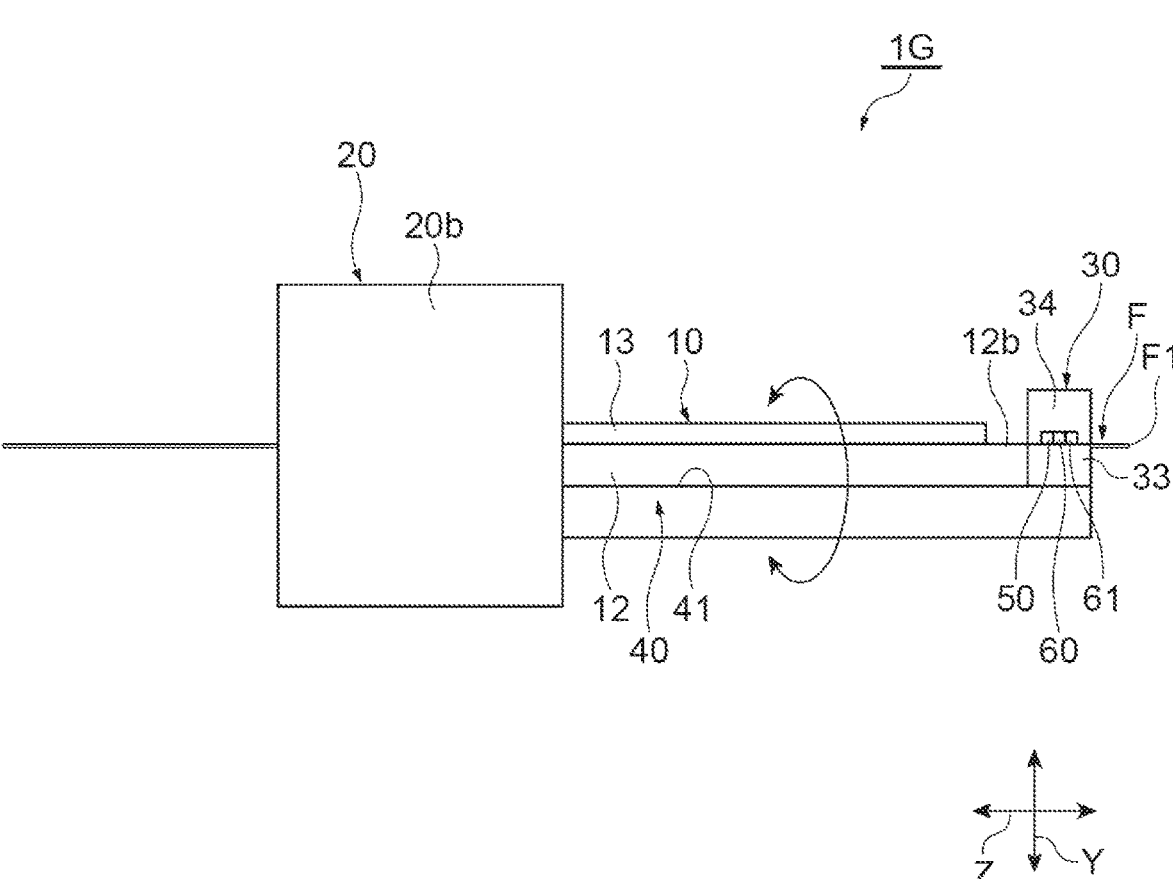
FIG. 10 is a side view schematically illustrating an optical fiber holder, a rotation mechanism, and a clamp unit of a fusion splicing machine according to Modified Example 7.

FIG. 10 is a side view illustrating a fusion splicing machine 1G according to Modified Example 7. In the fusion splicing machine 1G, the bending portion 50, the light source 60, and the power source 61 are arranged on the lid 34 of the clamp unit 30. Also in the fusion splicing machine 1G, since the clamp unit 30 pressing the optical fiber F rotates together with the optical fiber holder 10 during rotation of the optical fiber F, the optical fiber F can be prevented from being damaged during rotation. Therefore, the same effects as those of the fusion splicing machine 1F can be obtained.

Figure 11:
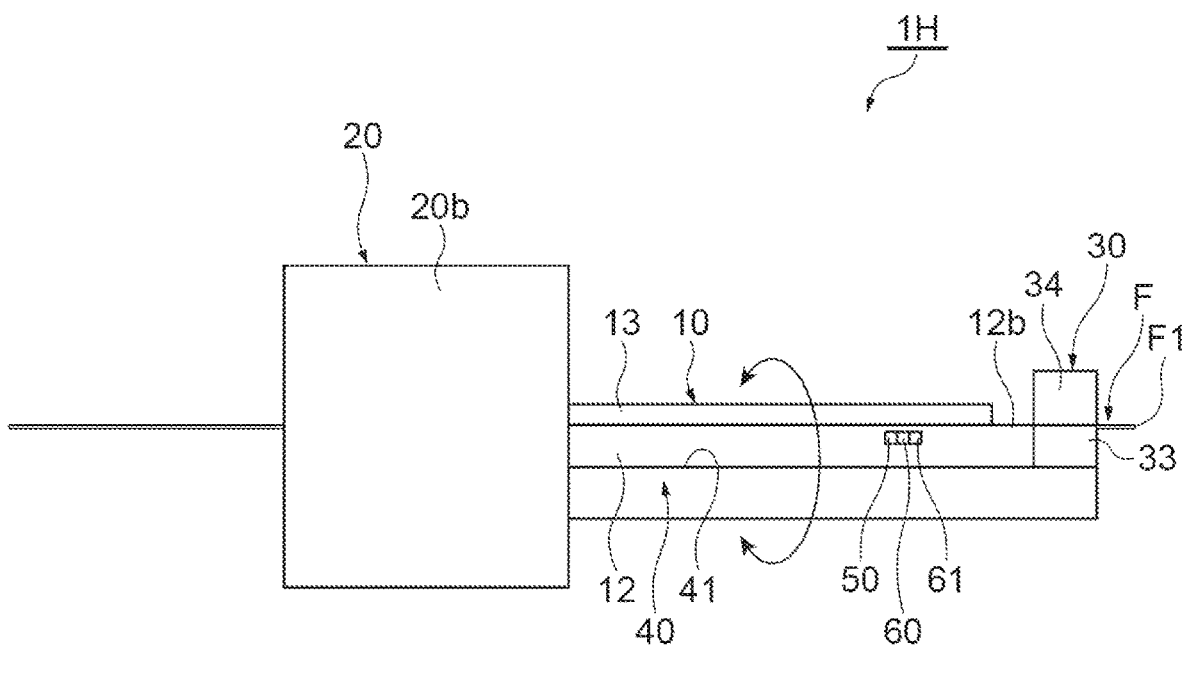
FIG. 11 is a side view schematically illustrating an optical fiber holder, a rotation mechanism, and a clamp unit of a fusion splicing machine according to Modified Example 8.
Figure 11:
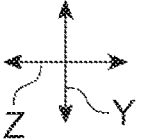
Figure 12:
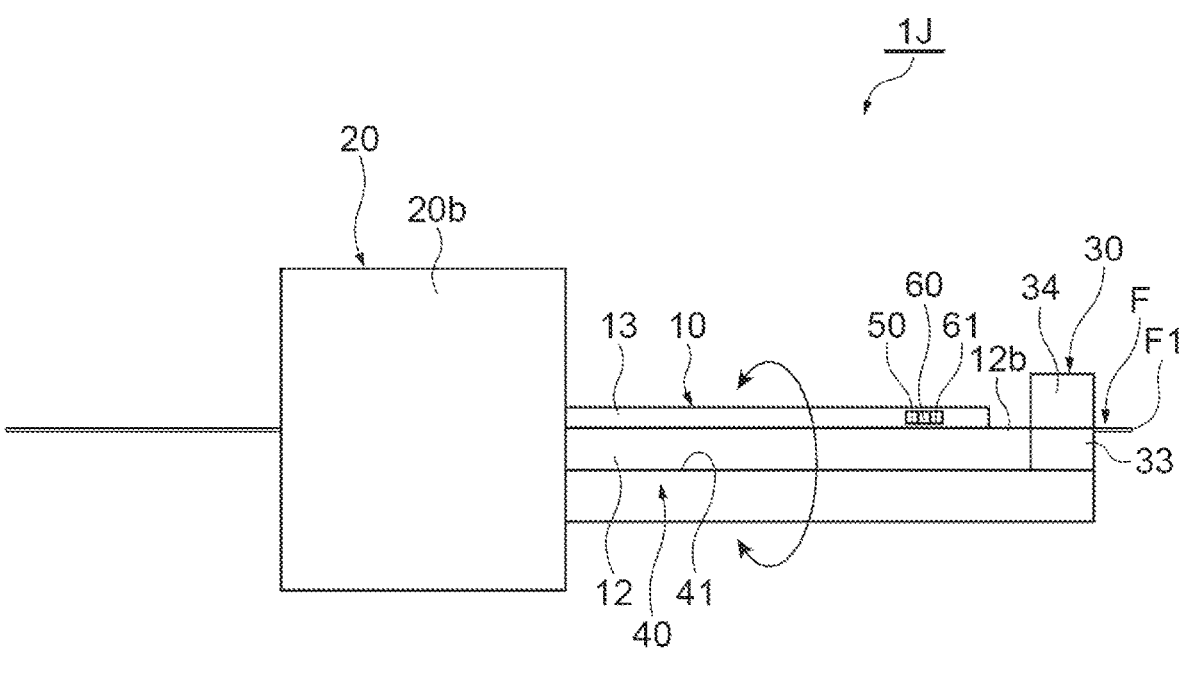
FIG. 12 is a side view schematically illustrating an optical fiber holder, a rotation mechanism, and a clamp unit of a fusion splicing machine according to Modified Example 9.

FIG. 11 is a side view illustrating a fusion splicing machine 1H according to Modified Example 8. FIG. 12 is a side view illustrating a fusion splicing machine 1J according to Modified Example 9. As illustrated in FIGS. 11 and 12, in the fusion splicing machine 1H, the bending portion 50, the light source 60, and the power source 61 are arranged on the base 12 of the optical fiber holder 10, and in the fusion splicing machine 1J, the bending portion 50, the light source 60, and the power source 61 are arranged on the lid 13 of the optical fiber holder 10. Also in the fusion splicing machines 1H and 1J described above, since the clamp unit 30 pressing the optical fiber F rotates together with the optical fiber holder 10, the optical fiber F can be prevented from being damaged during rotation. Therefore, the same effects as those of the fusion splicing machine 1F can be obtained.

Figure 13:
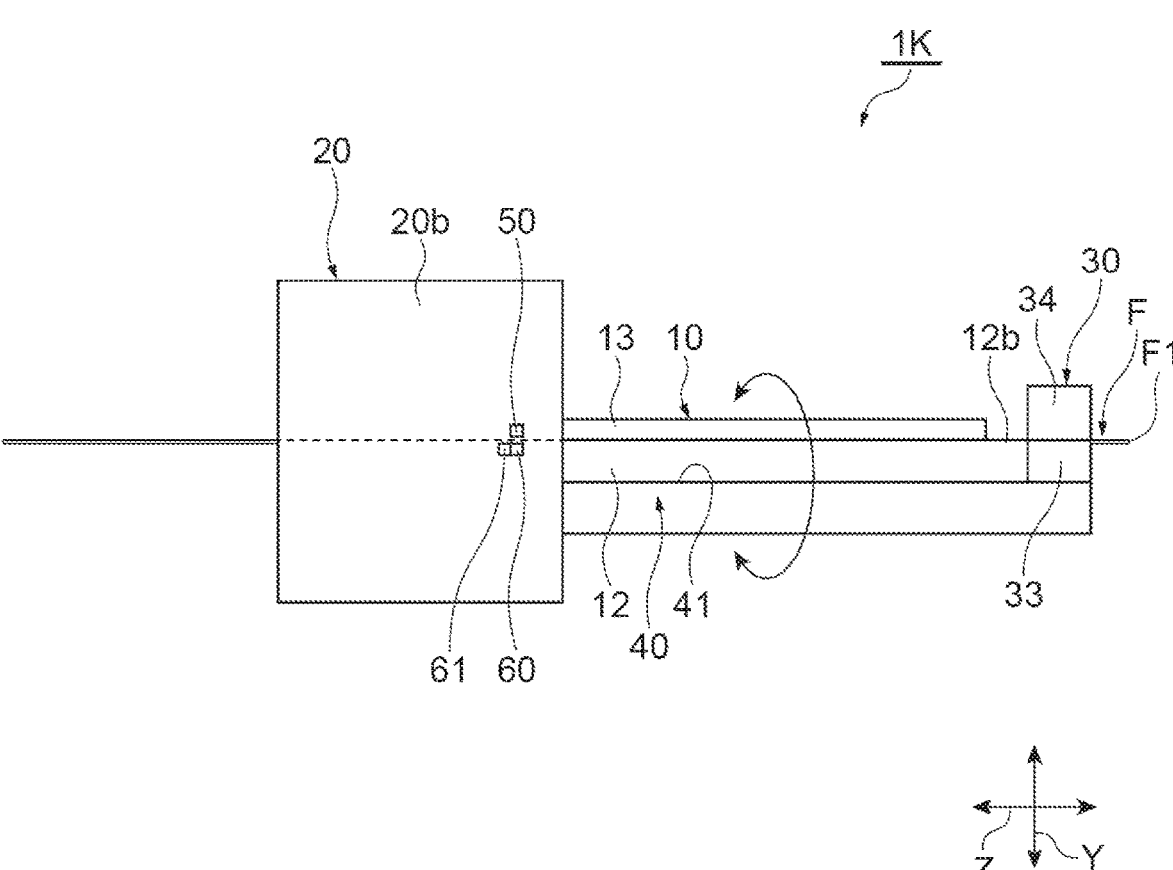
FIG. 13 is a side view schematically illustrating an optical fiber holder, a rotation mechanism, and a clamp unit of a fusion splicing machine according to Modified Example 10.
Figure 14:
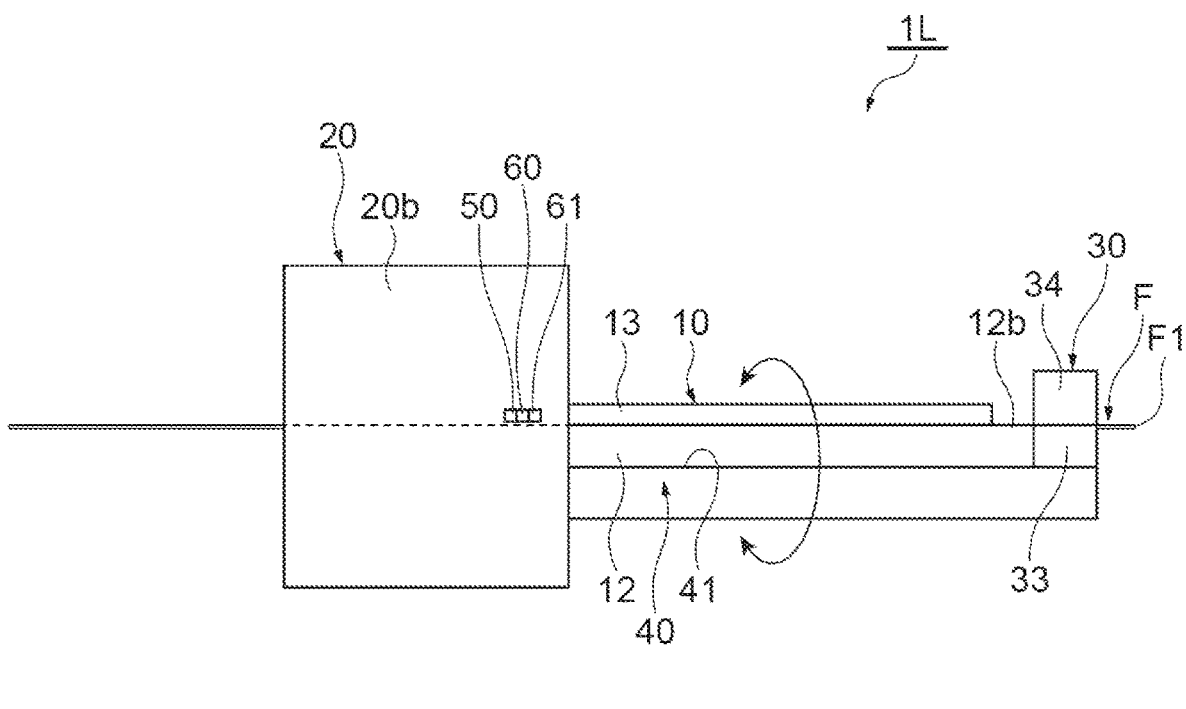
FIG. 14 is a side view schematically illustrating an optical fiber holder, a rotation mechanism, and a clamp unit of a fusion splicing machine according to Modified Example 11.

FIG. 13 is a side view illustrating a fusion splicing machine 1K according to Modified Example 10. FIG. 14 is a side view illustrating a fusion splicing machine 1L according to Modified Example 11. As illustrated in FIGS. 13 and 14, in the fusion splicing machines 1K and 1L, the bending portion 50, the light source 60, and the power source 61 are arranged in the rotation mechanism 20. In the fusion splicing machine 1K, the bending portion 50 and the light source 60 are arranged at positions interposing the optical fiber F, and in the fusion splicing machine 1L, the bending portion 50 and the light source 60 are arranged on the same side as viewed from the optical fiber F. In the above fusion splicing machines 1K and 1L as well, since the clamp unit 30 rotates together with the optical fiber holder 10, the optical fiber F can be prevented from being damaged during rotation, and thus, the same effects as those of the fusion splicing machine 1F can be obtained.

The embodiments and various modifications of the fusion splicing machine according to the present disclosure have been described above. However, the invention is not limited to the above-described embodiments or modifications. That is, it is easily recognized by those skilled in the art that the present invention can be variously modified and changed within the scope of the spirit described in the scope of the claims. The configuration of each unit of the fusion splicing machine can be changed as appropriate within the scope of the above spirit. The shape, size, number, material, and arrangement of each unit of the fusion splicing machine according to the present disclosure are not limited to the above-described embodiments, and can be changed as appropriate.

For example, in the above-described embodiments, the example in which the optical fiber holder 10 is detachable with respect to the holder base 40 has been described. However, the optical fiber holder may not be detachable from the holder base. In addition, the fusion splicing machine may not have the holder base 40. In this case, the fusion splicing machine in which the optical fiber holder 10 is fixed to the rotation mechanism 20 may be used.

For example, in the above-described embodiment and various modifications, the example where the bending portion 50 and the light source 60 are respectively arranged on any of the tip end side of the optical fiber F from the optical fiber holder 10, the optical fiber holder 10, and the rotation mechanism 20 is described. However, the number of bending portions 50 and light sources 60 may be plural and is not particularly limited.

REFERENCE SIGNS LIST 1, 1A, 1B, 1C, 1D, 1E, 1F, 1G, 1H, 1J, 1K, 1L: fusion splicing machine, 2: discharge electrode, 3: control unit, 10:

optical fiber holder, 11: V-groove, 12: base 12*b*: exposed portion, 13: lid, 20: rotation mechanism, 20*b*: peripheral surface, 30: clamp unit, 31: base, 32: lid, 33: fixing portion, 34: lid, 40: holder base, 41: mounting surface, 50: bending portion, 60: light source, 61: power source, 62: first electrode, 63: second electrode, F: optical fiber, F1: tip end.

The invention claimed is:

1. A fusion splicing machine comprising:

an optical fiber holder holding an optical fiber in a state of allowing a tip end of the optical fiber to protrude;

a rotation mechanism arranged on an opposite side of the tip end of the optical fiber holder and rotating the optical fiber holder around an axis extending along the optical fiber;

a bending portion bending the optical fiber;

a light source irradiating the optical fiber bent by the bending portion with light from the side of the optical fiber; and a power supply unit supplying power to the light source, wherein the bending portion and the light source are disposed in any of: a clamp unit on a side of the optical fiber on the tip end side relative to the optical fiber holder, the optical fiber holder, and the rotation mechanism, and wherein the bending portion and the light source rotate together with a clamp unit that presses the optical fiber and the optical fiber holder.

2. The fusion splicing machine according to claim 1, further comprising a holder base for mounting the optical fiber holder, wherein the optical fiber holder is detachable from the holder base, and wherein the bending portion and the light source are arranged on any of the holder base and the optical fiber holder.

3. The fusion splicing machine according to claim 2, further comprising:

a first electrode arranged on the optical fiber holder; and a second electrode arranged on the holder base, wherein the light source receives power from the power supply unit by electrically connecting the first electrode and the second electrode to each other when the optical fiber holder is mounted on the holder base.

4. The fusion splicing machine according to claim 2, further comprising a power source arranged on any of the optical fiber holder and the holder base, wherein the light source receives power from the power source through the power supply unit.

5. The fusion splicing machine according to claim 1, further comprising a clamp unit pressing the tip end portion of the optical fiber held by the optical fiber holder, wherein the bending portion and the light source are arranged in the clamp unit.

* * * * *